United States Patent [19]

Cake

[11] 3,845,615
[45] Nov. 5, 1974

[54] MULTIPLEXED LIQUID CRYSTAL DISPLAY
[75] Inventor: Arthur F. Cake, Smithtown, N.Y.
[73] Assignee: Uranus Electronics Inc., New Rochelle, N.Y.
[22] Filed: July 5, 1973
[21] Appl. No.: 376,413

[52] U.S. Cl. .................... 58/50 R, 307/38, 340/336
[51] Int. Cl. ............................................ G04b 19/30
[58] Field of Search ................ 58/23, 50 R; 307/38; 340/336; 350/160 LC

[56] References Cited
UNITED STATES PATENTS
3,740,717   6/1973   Huener et al. ................. 340/336 X Primary Examiner—Edith Simmons Jackmon
Attorney, Agent, or Firm—Richard G. Geib

[57] ABSTRACT

A means to stabilize impurities in a liquid crystal display to increase display life with means to multiplex display to commonize information lines without affecting displayed information whereby economics of circuitry is possible.

9 Claims, 3 Drawing Figures

//3,845,615

MULTIPLEXED LIQUID CRYSTAL DISPLAY

BACKGROUND

As has been widely reported, the application of electric fields to thin liquid crystal layers can lead to changes in molecular positional and orientational order. The most promising prospects for such phenomenon is in the field of informational display. Such types of displays have paramount advantages over other emerging display technologies of visibility in bright ambient lighting and a very low power and voltage requirement for setting out and changing the information for display. Already desk calculators and clocks and watches can be purchased using liquid crystal readouts. One of the first examples of the application of liquid crystal technology to these products is discussed by U.S. Pat. No. 3, 505, 804. However, as is stated by this patent liquid crystal displays have a limited life and it is best to integrate the display and driving circuitry in such a way as to permit periodic replacement of the liquid crystal.

In recent months it has been found that the useful life of liquid crystals is determinative by the rate of migration of impurities in the display. Many attempts have been made to manufacture pure liquid crystal displays to no avail. There are always impurities within the thin liquid crystal enclosure that with time will migrate towards the display areas to eventually fog over the display. It has been found that DC drive means aids in the lessening of the life of the display by affording a unidirectional force for the migration of impurities.

In addition, it has been thought prior to this invention that each liquid crystal display must have individual drive means for each of the seven segments of a numeric display. This has led to cumbersome and expensive manufacture of circuitry for driving several displays as are needed in watch and calculator designs on the market.

It is for the alleviation of the aforementioned problems that this invention is believed to be an important advance to the increased commercialization of liquid crystal displays.

More specifically it is a principal object of this invention to provide bidirectional pulses for activating a liquid crystal display using a DC power source to prevent migration of impurities whereby useful life of the display is markedly increased.

Another specific object of this invention is to utilize multiplexing means whereby driving circuitry may be reduced as much as fourfold with the attendant economies that such will bring about.

DESCRIPTION

The above stated and other objects will become more clearly apparent after a study of the following specification when read in conjunction with the accompanying drawings, in which.

Figure 1:
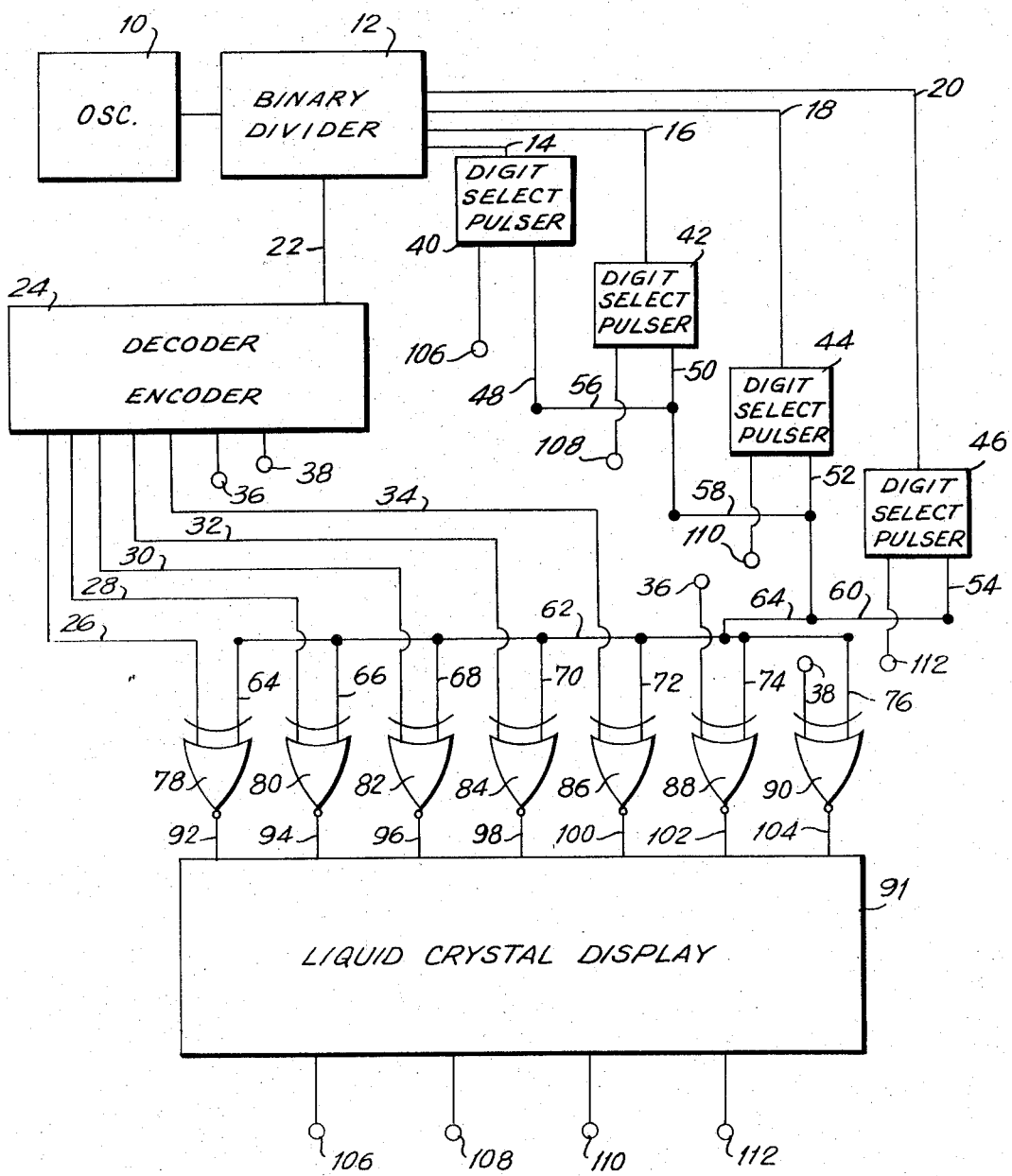
FIG. 1 is a schematic diagram illustrating one embodiment of the present invention.

With more particular regard to FIG. 1 there is shown an embodiment such as has proven successful for a liquid crystal time piece. An oscillator 10 is connected to a binary divider chain 12 for delivery of binary output code signals to leads 14, 16, 18 and/or 20 and a logic control signal via lead 22 to a decoder — encoder 24. Means to produce such signals are well known to those skilled in the art. The decoder-encoder means 24, also a device well known to those skilled in the art acts on the logic control signal command to provide conductivity state signals of ONE or ZERO in leads 26, 28, 30, 32, 34, 36 and/or 38. The code signals in leads 14, 16, 18 and/or 20 are acted upon by the respective digit select pulsers 40, 42, 44 and/or 46 to provide conductivity state signals of ONE or ZERO to leads 48, 50, 52 and/or 54 connected together by leads 56, 58 and 60 and to a lead 62 by a lead 64. Lead 62 is connected by leads 72, 64, 66, 68, 70, 74 and 76 to exclusive OR gates 78, 80, 82, 84, 86, 88 and 90 to which are also connected leads 26, 28, 30, 32, 34, 36 and 38. The circuitry of FIG. 1 is then completed by connecting the inverted output terminals of the exclusive OR gates to the liquid crystal display 91 by means of leads 92, 94, 96, 98, 100, 102 and 104 and by connecting leads 106, 108, 110 and 112 of pulsers 40, 42, 44 and 46 to the liquid crystal display 91.

Figure 3:
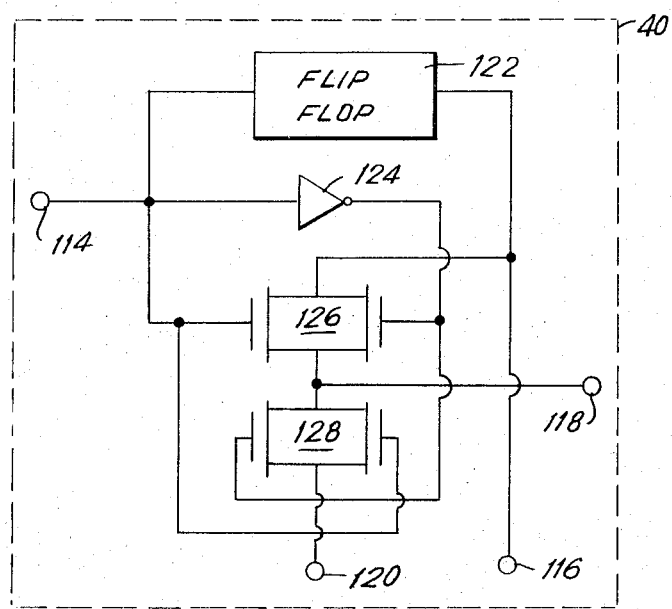

With reference now to FIG. 3 the digit select pulsers 40, 42, 44 and 46 are all constructed alike as shown by the schematic form of pulser 40. Lead 14 is connected to terminal 114, lead 48 is connected to terminal 116 and lead 106 is connected to terminal 118. Terminal 120 is connected to a voltage source by means of a device that will reduce the voltage supply at terminal 120 to less than that driving the display, preferably half of the amount to voltage available. The pulser comprises a flip-flop 122 and an invertor amplifier 124 connected across a pair of transmission gates 126 and 128.

Figure 2:
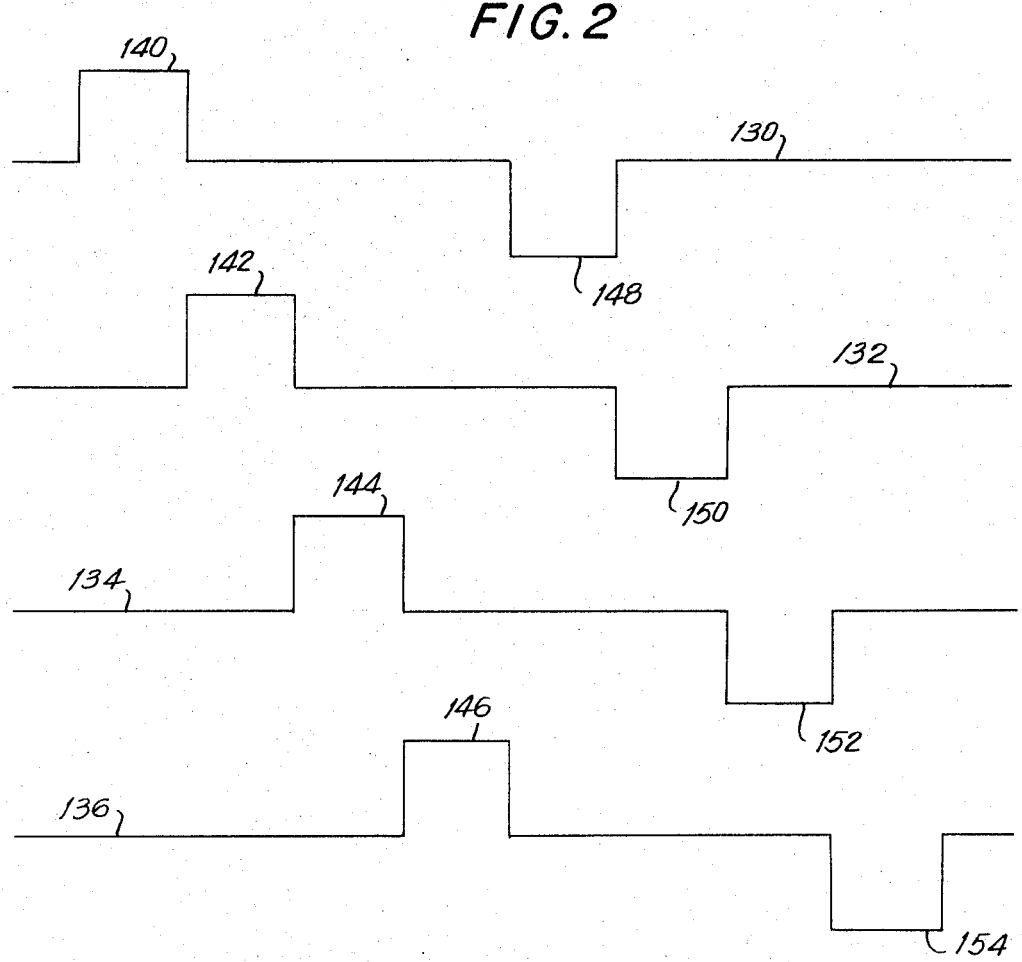
FIG. 2 is a pulsing waveform showing the sequencing of pulses possible from the digit select pulses of FIG. 1; and, FIG. 3 is a schematic diagram of one of the digit select pulses of FIG. 1.

With reference now to FIG. 2 there is shown four sequential waveforms 130, 132, 134, and 136 having positive pulses 140, 142, 144 and 146 and negative pulses 148, 150, 152 and 154, respectively. As can be seen upon decay of pulse 140 pulse 142 is generated such that each waveform is sequentially related. These waveforms are generated by the digit select pulsers 40, 42, 44, and 46 and are delivered from terminals, such as terminal 118, to the lead 62 for operation of the exclusive OR gates 78, 80, 82, 84, 86, 88 and 90. The flip-flop 122, as states above, has its output delivered directly via terminals, such as terminal 116, to the display 91. Therefore the display is in the form shown of the seven segment type familiar to those skilled in the art having four such seven segment displays within the block 91. Each of the corresponding segments of the four displays has a common exclusive OR gate. Such a display as is contemplated in each of the four displays in this invention is shown by U.S. Pat. No. 3,505,804 to provide time information of hours and minutes. In essence each segment provides with the housing of the display an area which if excited by an electrical field from the segment to the housing will appear to a viewer to as a line due to changes such field causes in the light-transmitting and light-reflecting properties of the liquid crystal there-between. By selecting various segments to be electrically productive of such field a number or letter can be made to appear to the viewer. Further and with specific reference to this invention the connection of the pulsers 40, 42, 44 and 46 to the exclusive OR gates and the display 91 is such that the segments are charged by positive then negative pulsers and the housing is charged oppositely negatively and then positively such that the display is excited by alternating current. The distinct advantage of this is in the localizing of impurities within the liquid crystal that have been proven to migrate with DC excitation of the display segments and housing toward the electrical field therebetween to fog and eventually obliterate the display areas of the segments.

The exclusive OR gate, as will be familiar to those skilled in the art is a device that will provide a 1 state output only, as in the structure of this invention, when the input from the pulsers and the decoder-encoder is not the same. Similarly the structure of the transmission gates 126 and 128 as well as the flip-flop 122 will be familiar to those skilled in the art. However, the driving of the gate 128 by a voltage less than, preferably, one-half of that from the power source for the rest of the circuit, such as the watch batteries, not shown, will, it has been found, prevent driving of the display until the transmission gate pulse is high as at 140, 142, 144 or 146 or low as at 148, 150, 152, or 154. This insures that only the signals desired from the divider chain on leads 14, 16, 18 or 20 will be passed in correlation with the signals on leads 26, 28, 30, 32, 34, 36 and/or 38 from 24.

The operation of this invention, it is believed, will appear from a reading of the above. It would only appear necessary to add that the oscillator is driven by a DC source such as a battery to provide frequency signals that are fed to the divider to be changed to pulses related to passage of time in hours and minutes and to the decoder-encoder to be related to the proper display segment of the hours and minutes area of same. The pulses from the divider chain are fed to pulsers 40 and 42 for hours information and pulsers 44 and 46 for minutes information. The pulsers then provide AC excitation of the appropriate display as aforesaid.

It will be or should be readily understood that the above description is of but a preferred embodiment of the present invention and is in no way to be limitive of the scope of the invention for it is intended that these Letters Patent will embrace all the various modifications, changes and adaptations as will fall in the range of equivalency of the structure set forth by the appended claims.

I claim:

1. An electronic timepiece comprising:
a solid state display for displaying time which includes a plurality of liquid crystal means having segment means to generate an electrical field within the display for changing molecular, positional and orientational order of the liquid crystal whereby hours and minutes may be made to appear;
an electrically operated circuit for providing an alternating current field for said liquid crystal means, said circuit having one part including a plurality of interconnected pulsers to sequentially produce signals representative of hours and minutes information for respective segment means of said liquid crystal means with one lead form each said pulsers being connected to said liquid crystal means, said circuit being completed by decoder-encoder means driving exclusive OR gates whose other inputs are connected to a common output lead of said pulsers, said exclusive OR gates being connected by leads to said segment means; and
a frequency source for said electrically operated circuit to provide constant frequency signals thereto.

2. The structure of claim 1 wherein said pulsers include flip-flop means connected to said circuit and transmission gates connected to said circuit and said flip-flop means, said gates being connected to a power source for said circuit so as to be operable to deliver voltage pulses to said exclusive OR gates.

3. The structure of claim 2 wherein the connection of the power source to the transmission gates is such as to provide a voltage of a predetermined magnitude less than capable from said power source.

4. The structure of claim 1 wherein the electrically operated circuit includes a connection to an oscillator providing the constant frequency signals, a binary divider for changing the frequency signals into lesser signals of hours and minutes, said decoder-encoder being also connected to said divider for receipt of conductivity state signals of 1 or 0 to one input of said exclusive OR gates.

5. The structure of claim 4 wherein the pulsers number four with two as hours pulsers and two as minutes pulsers controlled from signals from said divider with said common output lead from an output thereof to all exclusive OR gates and separate leads to each portion of the hours and each portion of the minutes display segment means.

6. The structure of claim 5 wherein the exclusive OR gates number seven, one for each segment of a seven segment means for numerical displays.

7. An electronic timekeeping device having sufficiently small power consumption for use as a wristwatch comprising:
means for generating periodic timekeeping signals;
digit select pulser means responsive to said timekeeping signals generating hours and minutes signals for two output leads one of which is connected to a common lead;
a liquid crystal display having hours and minutes display areas with seven segment displays in each of said areas with each of said areas connected to a separate portion of said digit select pulser means by the one of said two output leads not connected to said common lead; and
exclusive OR gate means connected to respective segments of said seven segment displays, to said code generator means and via said common lead to said digit select pulser means.

8. The structure of claim 7 wherein said digit select pulser means comprises a flip-flop means and a pair of transmission gates with a means to insure high and low signal pulses to said exclusive OR gates.

9. The structure of claim 8 wherein said flip-flop means of each digit select pulser means is connected to each of said areas of said, display.

* * * * *